UNITED STATES PATENT OFFICE.

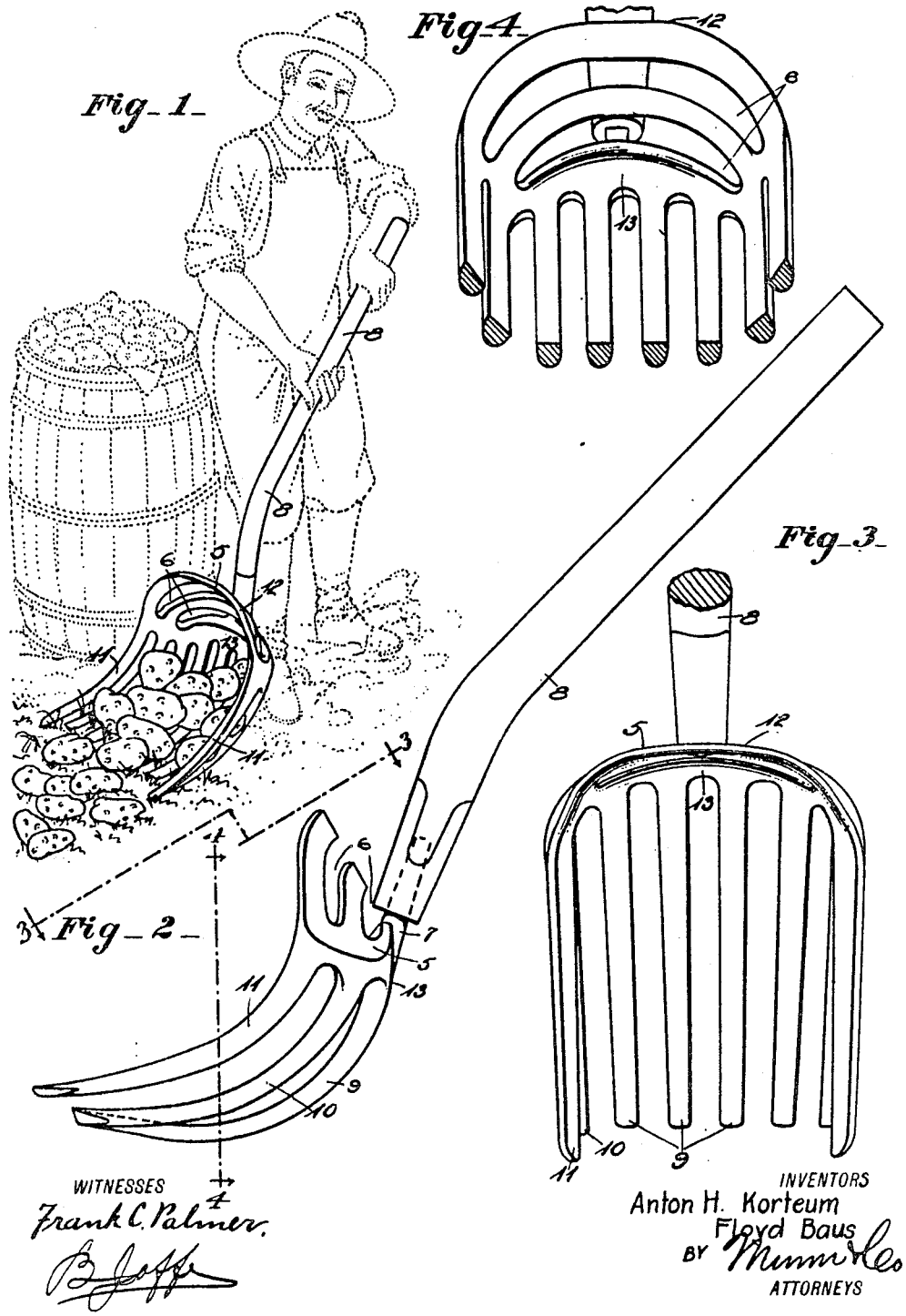

ANTON H. KORTEUM AND FLOYD BAUS, OF LONG PRAIRIE, MINNESOTA.

POTATO-FORK.

1,135,820.  Specification of Letters Patent.  Patented Apr. 13, 1915.

Application filed October 27, 1914. Serial No. 868,810.

*To all whom it may concern:*

Be it known that we, ANTON H. KORTEUM and FLOYD BAUS, citizens of the United States, and residents of Long Prairie, in the county of Todd and State of Minnesota, have invented a new and Improved Potato-Fork, of which the following is a full, clear, and exact description.

The invention relates to potato forks; and the object of the invention is to provide a simple, strong and handy fork whereby potatoes or similar articles can be handled efficiently. The fork is adapted to engage a proper load and to maintain the same even when vacillated in handling.

With the above and other objects in view, the nature of which will more fully appear as the description proceeds, the invention consists in the novel construction, combination and arrangement of parts as herein fully described, illustrated and claimed.

In the accompanying drawings forming part of the application, similar characters of reference indicate corresponding parts in all the views, and Figure 1 is a perspective view of the fork in use; Fig. 2 is a side elevation thereof; Fig. 3 is a section on line 3—3, Fig. 2; and Fig. 4 is a section on line 4—4, Fig. 2.

Referring to the drawings, 5 represents the head of the fork, which is concavo-convex in shape, slotted as shown at 6, to lighten the same, and provided at its lower portion with a stem 7 adapted to engage the handle 8 for handling the fork. Extending from the lower portion, or from the bottom, so to say, of the head 5 of the fork is a series of concavo-convex prongs 9 having a common cylindrical surface transverse of the head. Extending from each side of the head 5 is a pair of prongs 10 and 11 superimposed, the prong 10 being of less concavity than the prongs 9, and having its extremity in alinement with the prongs 9; and the prong 11 is of still less concavity than the prong 10 and extends beyond and above the extremities of the other prongs. It will be noted that the convex side of the head 5 faces the handle 8 and that the upper part or edge 12 of the head is convex, while the lower part 13 of the head is slightly concave. The prongs, with the head of the fork, have substantially the shape of the hollow of a hand.

It may be said that our fork differs from an ordinary fork in that it has a pair of U-shaped members built up above the fork and connected integrally thereto at the side of the U's adjacent the bottom, with the bottom of the U's location above the handle, and with the side of the U's bent in to conform to the shape of the fork.

From the foregoing description, taken in connection with the accompanying drawings, the advantage of the construction and operation of the device shown will be readily understood by those skilled in the art to which the invention pertains, and while we have described the principle of operation, together with the device which we now consider to be the best embodiment thereof, we desire to have it understood that the device shown is merely illustrative and that such changes may be made as are within the scope of the appended claims.

Having thus described our invention, we claim as new and desire to secure by Letters Patent:

1. A fork having a concavo-convex head; a stem for a handle adjacent the lower portion thereof, the convex side of said head facing the stem and projecting above the same; concavo-convex prongs extending from the lower portion of said head and having a common cylindrical surface disposed transversely of the head; and a pair of substantially superimposed concavo-convex prongs extending from each side of the head, the lower of each of said pair of superimposed prongs having its extremity in alinement with the extremities of the prongs from the lower portion of the head, the upper of each of said pair of superimposed prongs extending beyond and above the extremities of the other of said prongs.

2. A fork having a concavo-convex head, the upper edge of which is convex; a stem for a handle adjacent the lower edge of the head and central therewith, the convex side of said head facing the stem, with the convex edge of the same lying above said stem; concavo-convex prongs extending from the lower portion of said head, said prongs lying in a common cylindrical surface disposed transversely of the head; and a pair of substantially superimposed concavo-convex prongs extending from each side of the head, the lower of said pairs of superimposed prongs being of less curvature than the prongs extending from the lower portion of the head and having its extremity in alinement with the extremity of said prongs, the upper of each of said prongs being of less curvature than the lower prongs and having
5 their extremities extending beyond and above the other prongs.

In testimony whereof we have signed our names to this specification in the presence of two subscribing witnesses.

ANTON H. KORTEUM.
FLOYD BAUS.

Witnesses:
A. J. RHODA,
BYRON C. KOONZE.

Copies of this patent may be obtained for five cents each, by addressing the "Commissioner of Patents, Washington, D. C."